United States Patent [19]

Cameron et al.

[11] Patent Number: 5,531,883
[45] Date of Patent: Jul. 2, 1996

[54] ELECTRODE

[75] Inventors: Donald S. Cameron, Emmer Green; John M. Gascoyne, High Wycombe, both of United Kingdom

[73] Assignee: Johnson Matthey Public Limited Company, London, United Kingdom

[21] Appl. No.: 360,818

[22] PCT Filed: Jan. 12, 1994

[86] PCT No.: PCT/GB94/00057

§ 371 Date: Dec. 30, 1994

§ 102(e) Date: Dec. 30, 1994

[87] PCT Pub. No.: WO94/17223

PCT Pub. Date: Aug. 4, 1994

[30] Foreign Application Priority Data

Jan. 23, 1993 [GB] United Kingdom .................. 9301330

[51] Int. Cl.$^6$ ............................... C25B 1/00; C25B 11/00

[52] U.S. Cl. .......................... 205/626; 204/252; 204/283; 204/284; 204/290 R; 429/40; 429/42

[58] Field of Search ................... 204/283, 290 R, 204/284, 252; 205/626; 429/40, 42

[56] References Cited

U.S. PATENT DOCUMENTS

| | | | |
|---|---|---|---|
| 4,927,514 | 5/1990 | Solomon et al. | 204/290 R |
| 4,980,037 | 12/1990 | Hossain et al. | 204/290 R |
| 5,300,206 | 4/1994 | Allen et al. | 204/290 R |
| 5,308,465 | 5/1994 | Hillrichs et al. | 204/290 R |

Primary Examiner—John Niebling
Assistant Examiner—Kishor Mayekar
Attorney, Agent, or Firm—Cushman Darby & Cushman

[57] ABSTRACT

An air- or oxygen-breathing electrode suitable for use as a cathode in electrochemical cells, for example in low temperature ozone generation cells, comprises an insulating layer and has an improved electrochemical performance.

5 Claims, No Drawings

5,531,883

ELECTRODE

FIELD OF THE INVENTION

This invention relates to a novel gas porous electrode, and in particular to an air or oxygen breathing cathode suitable for use in the generation of ozone.

BACKGROUND OF THE INVENTION

Ozone has a range of uses similar to that of chlorine, including the bleaching of clays and pulp and the treatment of drinking water swimming pool water, municipal secondary effluents, high quality water (eg for electronic component manufacturing) and odours. Because chlorine produces chlorinated organics, which present long term toxicity hazards at low concentrations in water, there is a large potential market for a less toxic replacement for chlorine. Ozone has the potential to take over from chlorine. In addition, ozone may be used in organic synthesis for the oxidation of the carbon-carbon double bond, medical therapy and serialization. Examples of chemical syntheses using ozone include the production of silver oxide, heliotropin, pelargonic acid, azelaic acid, peracetic acid, germicides, steroids, Nylon-9 precursor and the separation of cerium from other rare earths.

Ozone has a short half-life, and because of its highly reactive nature, tends to decompose in contact with most metals and oxides and is potentially explosive when concentrated either as a gas or liquid or when dissolved into solvents or absorbed into gels. Transportation therefore is not practical, and consequently it is desirable to generate ozone at the point of use. Currently, the major method of ozone generation adopted in industry and the utilities is corona discharge. In this process an alternating, very high voltage is discharged through a dry air or oxygen steam, producing a flow of gases containing up to approximately 2% ozone where an air stream is used, and up to approximately 4% ozone where oxygen is used. Corona discharge methods for ozone production have several disadvantages. In particular, the equipment required is capital intensive and bulky. In addition, the process requires the feed gas to be cleaned, compressed, cooled and dried before passing to the discharge tube. The use of oxygen rather than air where higher yields of ozone are required, adds significantly to the cost. The low ozone:oxygen ratios mean that dissolution of the ozone into water or other process medium is difficult, with low rates of transfer. An additional drawback is that appreciable amounts of nitrogen oxides are produced when an air feed is used, ultimately producing nitric acid if the output stream contacts water.

Another method of ozone generation is the electrolysis of water. In this process, water is electrolysed between an anode and a cathode. At the anode, oxygen and ozone are evolved as a mixture. The generation of ozone is most efficient at low temperatures. At the cathode, hydrogen may be evolved, or oxygen may be reduced at a gas porous air or oxygen depolarised cathode, reducing the overall voltage required to drive current through the cell.

Gas porous electrode technology is highly developed, and the general principals of gas porous electrode fabrication are well known to those skilled in the art [See Fuel Cell Handbook, A J. Appleby and F R Foulkes, Pub. Van Nostrand Reinhold, 1989: and references therein, EP 0357077A3, U.S. Pat. No. 4,564,427, U.S. Pat. No. 4,927,514]. In general terms, a gas porous electrode is an electronically conducting structure including a high-surface area body and a suitable catalyst. For example a catalyst layer and a hydrophobic support layer may be deposited on an electronically conducting substrate. Air or oxygen breathing cathodes are generally constructed so as to produce the maximum area of a three-phase interface, that is the maximum area of interface between the solid catalyst material, the electrolyte medium, and the gas phase (which in the case of ozone generation, is air or oxygen). This may be achieved by the admixture of the catalyst with a wet-proofing agent such as polytetrafluoroethylene (ptfe), or fluorinated ethylene propylene (fep), or a wax, etc. The partially wet-proofed catalyst layer, which is gas permeable, may then be deposited in a uniform thin layer over a hydrophobic support material which should be gas permeable but prevent the passage of electrolyte. This support material may take the form of form example porous polytetrafluoroethylene film, wet-proofed carbon fiber paper, or mixtures of carbon with polytetrafluoroethylene or similar hydrophobic binders. A suitable conducting substrate such as carbon paper or cloth or a carbon fluoro-polymer mixture may be incorporated into the electrode, to enable uniform distribution of current across the electrode. Said conducting substrate may typically take the form of a woven mesh, a felt of randomly-orientated fibers, or a pierced sheet which may also have been stretched to form an expanded metal mesh. The material of the mesh is not critical, as long as it has good conductivity, and resistance to corrosion by the electrolyte. For example, it may be stainless steel, monel, Hastelloy, silver, copper, nickel, carbon or one of these covered by a more corrosion-resistant coating such as platinum or gold.

For effective diffusion of gases to the catalyst layer, and ions to the electrolyte, electrodes have previously been fabricated as this as possible to minimum diffusion losses.

In the electrolytic generation of ozone, the oxygen source may be pure oxygen or may be supplied from the atmosphere. The oxygen reduction process at the cathode is much improved by operation at higher temperatures. Therefore there is direct conflict in the electrochemical generation of ozone, between the requirements for operation of the anode, and the requirements for operation of the cathode. To avoid excessive ohmic resistance losses, the gap between anode and cathode must be kept small. This presents a number of problems. For example, operation of the anode at very low temperatures such as chilling the back face to below −40° C., can be conductive cooling through the electrolyte reduce the temperature of the cathode structure to below 0° C. This can lead to condensation of moisture from the feed air supply. Particularly at low current density, the coldness of the anode and electrolyte can so chill the air cathode that this moisture can form a layer of frost on the air face of the electrode, thus reducing the ingress of oxygen by diffusion, and limiting the cathode performance. This imposes a need to reduce the humidity in the air supply to very low levels.

Further, the absorbed moisture may migrate through the cathode to dissolve in the electrolyte, thereby producing a commensurate increase in overall volume and a reduction in electrolyte concentration. In extreme cases this may lead to a significant degradation of cell efficiency. In addition, the cooling requirement for the anode is increased by the thermal input via both the air passing over the cathode and the heating effect of ohmic resistance losses within the cathode.

Conventionally, in such a system the air supplied to the cathode is dried by means of a desiccant scrubber, such as silica gel, a pressure swing absorption drier, or a low temperature condenser, in order to reduce the dew point well below that likely to be observed at the air face of the cathode. Extra electrical power, and/or materials for the driers, are required.

SUMMARY OF THE INVENTION

We have invented a thermally insulated air or oxygen breathing electrode suitable for use as a cathode in electrochemical cells, for example in low temperature ozone generation cells wherein said electrode eliminates the need for removing moisture from the air to oxygen feed to the cathode, reduces the chilling requirement for the anode by reducing thermal transfer through the cathode to the electrolyte, and prevents frost being formed on the cathode. Improved electrochemical performance is observed as a consequence of ability to operate the cathode at higher temperatures.

The electrode of the present invention is also suitable for use in air concentration cells wherein low temperature air may be fed to the cell. In this case the insulating layer would serve to keep the anode warm.

Accordingly, this invention provides an air- or oxygen-breathing electrode suitable for use in electrochemical cells and having an air contacting side and an electrolyte contact side, characterized in that an electrolyte or ion-porous insulating layer is attached to, or forms an integral part of, the electrolyte contacting side of the electrode.

The invention further provides an air- or oxygen-breathing electrode suitable for use in low temperature ozone generation cells, characterized in that said electrode has an electrolyte- or ion-porous insulating layer attached to it or forming an integral part of that side of the electrode which is to contact the electrolyte.

DETAILED DESCRIPTION OF THE INVENTION

The insulating layer enables the maintenance of a static layer of electrolyte or ion porous medium adjacent to the catalyst layer of the electrode while allowing the passage of ions to and from the catalyst layer to enable it to function in an air or oxygen depolarized mode.

The basic electrode structure may be any conventional gas porous electrode structure such as those referred to hereinabove.

The insulating layer may be any permeable, non-corrodible material which will maintain its mechanical integrity in the conditions encountered in the cell. Advantageously the insulating layer comprises a poor thermal conductor material. Examples of suitable materials include carbon fiber paper, woven carbon felt, porous polyethylene, polypropylene and other polymeric films such as polytetrafluoroethene (PTFE) and fluorethyl propylene, woven fabrics and non-woven felts. Each of these may or may not be subject to some form of pre-treatment before incorporation into the electrode. An example may be to treat the insulating layer, for example PTFE, with alcohol prior to "wet-proofing".

The insulating layer should be affixed to the electrode in such a way as to maintain electrolyte porosity to the catalytically active face of the electrode. Therefore, the means of affixing the insulating layer is preferably by way of a porous adhesive or polymeric bonding agent, or by the non-continuous application of an adhesive or polymeric bonding agent. Suitable materials for affixing the insulating layer to the electrode include ptfe, fep, pvc and Nafion™. Most preferably one face of the insulating layer forms an integral part of the outer catalyst layer.

The thickness of the insulating layer is dependent partly on the degree of insulation required, but is limited by the need to keep the inter-electrode gap to a minimum as this has an effect on the ohmic losses experienced by the cell. Typically the thickness of the insulating layer is in the range of 0.2 mm to 5 mm.

The insulating layer need not completely cover a whole face of the electrode, but preferably the insulating layer is present on substantially all of the side of the electrode which is to contact the electrolyte.

The insulating layer may include on part or all of its surface a separator to reduce decomposition of ozone by the catalyst. An example of a material suitable for use as a separator is graphite cloth. This embodiment would provide a dual function barrier, the two functions being firstly as a thermal barrier and secondly as a retardant catalyst decomposition barrier.

The invention further provides a process for the production of ozone by electrolysis of an electrolyte wherein ozone is generated at a cathode which is an air- or oxygen-breathing depolarised electrode according to the invention.

The invention additionally provides an ozone-generating electrolysis cell comprises a cathode, an electrolyte and an anode wherein the cathode is an air- or oxygen-breathing electrode according to the invention.

Suitable electrolytes include $H_2SO_4$, $HBF_4$, $HClO_4$, $NaClO_4$, $Na_2SO_4$, $H_3PO_4$.

Suitable cathodes are platinum group metal or mixed metal, or platinum alloy catalysts such as platinum black or carbon supported platinum, palladium black or carbon supported palladium, macrocyclic catalysts, for example metallated phthalocyanines, or porphyrins supported on suitable conducting substrates such as carbon blacks, graphites etc.

EXAMPLES

The present invention will now be described by way of Example. The "Difference" columns in the Examples refer to the temperature difference between the electrolyte side and the air side of the electrode.

Example 1

Uninsulated Electrode

A hydrophobic material for incorporation into the catalyst layer was provided by dispersing 70 parts by weight of Shawinigan acetylene black [Chevron] in water at 60° C. To this was added an aqueous dispersion of polytetrafluoroethylene (ptfe) [grade GPI™, ICI] to give 30 parts by weight of dry fluorocarbon solids. The resulting material was dried and milled to form a powder. A catalyst layer was prepared by dispersing a mixture of platinum black (61 parts by weight), XC72 carbon black [Cabot Corporation] (26 parts by weight), the acetylene black:ptfe powder prepared previously (3 parts by weight) and ptfe powder [5 μm particles; BDH] (1.4 parts by weight) in water. To this dispersion was added an aqueous dispersion of ptfe [GP1] giving 8.6 parts dry fluorocarbon solids. The resulting suspension was deposited evenly onto a separable filter paper in sufficient amount to provide 14 mgcm$^{-2}$ (dry basis) of platinum black. The layer was de-watered using vacuum filtration to produce a layer of slightly damp solids.

A hydrophobic support layer was prepared by dispersing 50 parts by weight of Shawinigan acetylene black in water at 60° C. and adding an aqueous dispersion of ptfe (GPI) at 50 parts by weight dry solids. The resulting suspension was deposited evenly onto the damp layer of catalyst material prepared above in sufficient amount to provide 10 mgcm$^{-2}$ of solids. The combined layers were de-watered using vacuum filtration. A foraminous expanded metal mesh was pressed into the resulting damp solids. The mesh current collector was gold plated stainless steel wire 0.2×0.1 mm cross section with approximately 50% open area. The solids were dried and compacted under a pressure at 400 lbs psi. The dry electrode was sintered at 340° C. under a nitrogen atmosphere for 15 minutes.

16 sq cm of a 30 sq cm electrode, passed as above was evaluated as an air cathode in an electrochemical cell. The cell consisted of a chemically inert glassy carbon anode of 16 sq cm exposed area and the air cathode, with an inter-electrode gap of 2.5 cm and a dc power supply. The anode evolved a mixture of ozone and oxygen at the same total atomic ratio as the air cathode consumed oxygen from a circulating air supply. The air supply flowed at four times oxygen stoichiometry and the cell electrolyte was 47% $HBF_4$. The anode was cooled by an alcohol bath, in direct contact with the back of the anode. The alcohol bath was maintained at approximately −40° C.

Thermocouples were attached to both the electrolyte side (catalyst face) of the cathode and to the air side in order to measure the temperature differences at a series of current densities (with respect to the cathode area). The results of testing the uninsulated electrode are set out in Table 1.

TABLE 1

| Current | Cathode Temperature °C. | | Difference |
|---|---|---|---|
| mA cm$^{-2}$ | Electrolyte | Air | °C. |
| 0 | −23.0 | −15.0 | 8.0 |
| 50 | −17.6 | −12.2 | 5.4 |
| 100 | −12.0 | −7.2 | 4.8 |
| 150 | −6.0 | −2.1 | 3.9 |
| 200 | −0.3 | +3.5 | 3.8 |
| 250 | +4.7 | +8.4 | 3.7 |
| 300 | +9.9 | +13.3 | 3.4 |
| 350 | +15.5 | +18.6 | 3.1 |
| 400 | +20.2 | +23.4 | 3.1 |

Example 2

16 sq cm of a 30 sq cm electrode, as prepared in Example 1 were covered by a 3 mm thick piece of carbon felt (HTS: W & R Balston). The felt was attached to the electrode face of a matrix of small (1 mm diameter) spots of epoxy resin; the electrode and felt being held together, under pressure until the resin had set. Thermocouples were attached to both the electrolyte side (catalyst face) of the cathode and to the air side in order to measure the temperature differences at a series of current densities (with respect to the cathode area). The electrode was evaluated as an air cathode in an electrochemical cell as described in Example 1. The results of testing this insulated electrode are set out in Table 2.

TABLE 2

| Current | Cathode Temperature °C. | | Difference |
|---|---|---|---|
| mA cm$^{-2}$ | Electrolyte | Air | °C. |
| 0 | 25.0 | −17.4 | 7.6 |
| 50 | −19.0 | −10.4 | 8.6 |
| 100 | −12.3 | −3.9 | 8.4 |
| 150 | 5.5 | +2.5 | 8.0 |
| 200 | +0.5 | +9.7 | 10.2 |
| 250 | +6.8 | +16.8 | 10.0 |
| 300 | +14.0 | +24.7 | 10.7 |
| 350 | +19.6 | +34.3 | 14.7 |
| 400 | +24.6 | +39.7 | 15.1 |

Example 3

16 sq cm of a 30 sq cm electrode, as prepared in Example 1 was brush-coated with a layer of perfluorinated ion exchange powder in a 5% alcohol:water solution (Nafion™, E I du Pont). A 16 sq cm by 0.75 mm thick piece of ultra-high molecular weight (UHMW) porous polyethylene foam (Vyon™, Porvair Ltd), was similarly brush-coated with Nafion solution and was held in contact with the coated cathode, under pressure (200 psi), and the Nafion solutions had dried. Thermocouples were attached to both the electrolyte side (catalyst face) of the cathode and to the air side in order to measure the temperature differences at a series of current densities (with respect to the cathode area). The electrode was evaluated as an air cathode in an electrochemical cell as described in Example 1. The results of testing this insulated electrode are set out in Table 3.

TABLE 3

| Current | Cathode Temperature °C. | | Difference |
|---|---|---|---|
| mA cm$^{-2}$ | Electrolyte | Air | °C. |
| 0 | −23.8 | −16.0 | 7.8 |
| 50 | −16.0 | −8.0 | 8.0 |
| 100 | −8.0 | −2.0 | 6.0 |
| 150 | −1.5 | +4.0 | 5.5 |
| 200 | +5.6 | +11.0 | 5.4 |
| 250 | +12.8 | +17.0 | 4.2 |

Example 4

A catalyst layer was prepared by dispersing a mixture of platinum black (69 parts of weight), XC72 carbon black [Cabot Corporation] (20 parts by weight), Shawinigan acetylene black (2.2 parts by weight) and ptfe powder [Fluon™ Lt700; ICI] (2.2 parts by weight) in water. To this dispersion was added an aqueous dispersion of ptfe [GPI] giving 6.6 parts of dry fluorocarbon solids. The resulting dispersion was deposited evenly onto a sheet of pre-wetted carbon fiber cloth (PWB-3 low oxidation carbon fabric; Zoltek Corp) resting on a separable filter paper. The amount laid down being sufficient to provide 12 mg (dry basis) of platinum black per square cm. The layer was de-watered using vacuum filtration to produce a layer of slightly damp solids.

A hydrophobic support layer was prepared as described in Example 1. The resulting suspension was deposited evenly onto the damp layer of catalyst material, formed above, in sufficient amount to provide 10 mgcm$^2$ of solids. The combined layers were de-watered using vacuum filtration. A foraminous expanded metal mesh was pressed into the resulting damp solids. The mesh current collector was gold plated stainless steel wire 0.2×0.1 mm cross section with approximately 50% open area. The solids were dried and compacted under a pressure of 1000 psi. The dry electrode was sintered at 340° C. under a nitrogen atmosphere for 15 minutes.

16 sq cm of a 30 sq cm electrode, prepared as above, was evaluated as an air cathode in an electrochemical cell as described in Example 1. Thermocouples were attached to both the electrolyte side (front of carbon cloth) of the cathode and to the air side in order to measure the temperature differences at a series of current densities (with respect to the cathode area). The results of testing this insulated electrode are set out in Table 4.

TABLE 4

| Current | Cathode Temperature °C. | | Difference |
|---|---|---|---|
| mA cm$^{-2}$ | Electrolyte | Air | °C. |
| 0 | −24.4 | −17.7 | 6.7 |
| 50 | −13.4 | −6.8 | 6.6 |
| 100 | −7.6 | −1.5 | 6.1 |
| 150 | −3.4 | +2.5 | 5.9 |
| 200 | +2.4 | +8.5 | 6.1 |
| 250 | +8.7 | +14.8 | 6.1 |

Example 5

A hydrophobic support layer electrode was prepared by dispersing 50 parts by weight of Shawinigan acetylene black in water at 60° C. and adding an aqueous dispersion of ptfe (GPI) at 50 parts by weight dry solids. The resulting suspension was deposited evenly onto a separable filter paper. The amount laid down being sufficient to provide 15 mg (dry basis) of carbon:ptfe dry solids per sq cm. The layer was de-watered using vacuum filtration to produce a layer of slightly damp solids. A foraminous expanded metal mesh was pressed into the resulting damp solids. The mesh current collector was gold plated stainless steel wire of 0.2×0.1 mm cross section with approximately 50% open area. The solids were dried and compacted under a pressure of 300 psi. The dry electrode was sintered at 340° C. under a nitrogen atmosphere for 15 minutes.

A catalytic material for forming into a catalyst layer was provided by dispersing 20 parts by weight of platinum black in water. To this was added 20 parts by weight of a 5% solution of perfluorinated ion exchange powder in alcohol:water (9:1) (Nafion™, E I du Pont). The mixture was evaporated to dryness under vacuum and the resulting material was milled to form a powder. 21 parts by weight of the platinum:Nafion powder was dispersed in water and 5 parts by weight of the 5% solution of Nafion powder in alcohol:water (9:1) added to form a thick suspension. Carbon fiber paper (half ounce per square yard; Union Carbide) was fully impregnated with the thick suspension of platinum black-Nafion and allowed to dry. A second sheet of the carbon fiber paper was impregnated with the 5% solution of Nafion powder in alcohol:water (9:1) and allowed to dry. The catalysed carbon fiber paper and the Nafion impregnated paper were placed together and heated to 170° C. under pressure (200 psi) to bond together.

A hydrophobic support layer electrode prepared as above was brush-coated by 5% solution of perfluorinated ion exchange powder in alcohol:water (9:1) (Nafion™, E I du Pont). The catalysed carbon fiber paper assembly, prepared above, was placed catalyzed layer down on the hydrophobic supported electrode and the two bonded together under pressure (200 psi) at 170° C. A further six layers carbon fiber paper pre-impregnated with 5% solution of Nafion powder in alcohol:water (9:1) were thermally bonded at 170° C. (pressure 200 psi) to the front face of the electrode to complete the structure.

16 sq cm of a 30 sq cm electrode, prepared as above was evaluated as an air cathode in an electrochemical cell as described in Example 1. Thermocouples were attached to both the electrolyte side (in front of the carbon fiber paper layers) of the cathode and to the air side in order to measure the temperature differences at a series of current densities (with respect to the cathode area). The electrode was evaluated as an air cathode and the results of treating this insulated electrode are set out in Table 5.

TABLE 5

| Current | Cathode Temperature °C. | | Difference |
|---|---|---|---|
| mA cm$^{-2}$ | Electrolyte | Air | °C. |
| 0 | −25.0 | −12.3 | 12.7 |
| 50 | −13.7 | −1.3 | 12.4 |
| 100 | −6.2 | +4.3 | 10.5 |
| 150 | +1.0 | +9.6 | 8.6 |

CONCLUSIONS

The temperature differential between the electrolyte face and the air side of an uninsulated air breathing cathode, in the test cell, rapidly falls from an equilibrium (open circuit) value of about 8° C. to between 3° and 4° C. at normal operating current densities ($\geq 150$ mAcm$^{-2}$). In the case of the insulated cathodes the temperature differential tends to change very little and with some insulating materials such as carbon felt (Example 2) rises. At practical operating current densities ($\geq 150$ mAcm$^{-2}$) the air side of the insulated cathodes also shows temperatures above 0° C. compared to the −2° C. of the uninsulated version.

What is claimed is:

1. An air-breathing electrode suitable for use in low temperature ozone generation cells having an air contacting side and an electrolyte contacting side, said electrode comprising, in the following order, a mesh current collector layer, a hydrophobic support layer, a catalyst layer for contacting the electrolyte, a porous thermal insulating layer, and a retardant catalyst decomposition barrier layer in or on said insulating layer.

2. An air-breathing electrode according to claim 1, wherein the thermal insulating layer comprises at least one of pre-treated or non-pre-treated carbon fiber paper, woven carbon felt, porous polyethylene, polypropylene, polymeric film, woven fabrics, and non-woven felts.

3. An air-breathing electrode according to claim 1, wherein the barrier layer is formed from carbon.

4. A process for the production of ozone by electrolysis of an electrolyte, said process comprising the step of generating ozone at a cathode which is in an air-breathing electrode according to any one of claims 1, 2 or 3.

5. An ozone-generating electrolysis cell comprising a cathode, an electrolyte and an anode wherein the cathode is an air-breathing electrode according to claim 1.

* * * * *